April 26, 1932. E. M. PHILLIPS 1,855,890
SPRING RETAINER FOR SHAFT PACKINGS AND THE LIKE
Filed Oct. 12, 1929
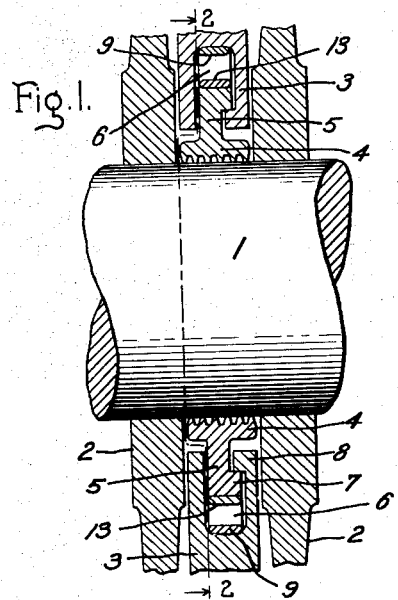
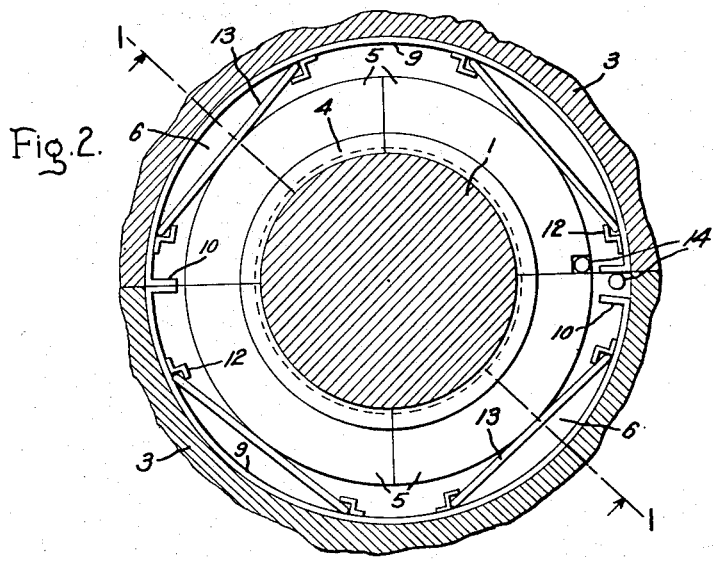
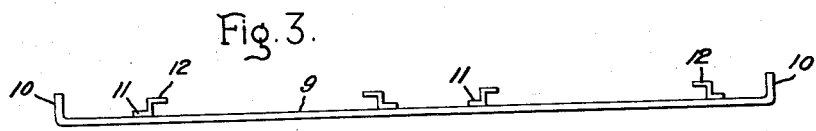
Inventor:
Edmund M. Phillips,
by Charles E. Mullen
His Attorney.

Patented Apr. 26, 1932

1,855,890

UNITED STATES PATENT OFFICE

EDMUND MERRILL PHILLIPS, OF LYNN, MASSACHUSETTS, ASSIGNOR TO GENERAL ELECTRIC COMPANY, A CORPORATION OF NEW YORK

SPRING RETAINER FOR SHAFT PACKINGS AND THE LIKE

Application filed October 12, 1929. Serial No. 399,372.

The present invention relates to spring retainers, and while it is not limited thereto necessarily, it finds special utility in connection with packings for rotating shafts.

The object of my invention is to provide an improved construction and arrangement of spring retainer, and for a consideration of what I believe to be novel and my invention, attention is directed to the following specification and the claims appended thereto.

A specific application of my invention is in connection with spring retainers for diaphragm shaft packings of elastic fluid turbines, and in the drawings and the following description I have specifically illustrated and described this application of my invention.

In the drawings, Fig. 1 is a sectional view through a diaphragm shaft packing embodying my invention, the section being taken on line 1—1, Fig. 2; Fig. 2 is a transverse sectional view taken on line 2—2, Fig. 1; and Fig. 3 is a detailed view of a spring holder.

Referring to the drawings, 1 indicates a shaft, which may be the shaft of an elastic fluid turbine, 2 indicates bucket wheels carried by shaft 1, and 3 indicates an annular member, in the present instance forming a part of a nozzle diaphragm located between the two bucket wheels and carrying a shaft packing member 4, which may be of any suitable type. The shaft packing member 4 has a ring portion 5 which projects into an inwardly facing annular recess or groove 6 in the diaphragm, the ring portion 5 being provided with a shoulder 7 which engages an inturned flange 8 which forms a part of the diaphragm. The diaphragm and packing member are split at their horizontal axes to form upper and lower halves, the upper half of the packing member being in the upper half of the diaphragm, and the lower half of the packing member being in the lower half of the diaphragm. Also, in the present instance each half of packing member 4 is shown as comprising two parts, the packing member thus being divided into four quarters. The construction so far described is a known one in connection with diaphragm packings for elastic fluid turbines. My invention relates particularly to an improved construction of spring retainer for holding the packing in position with its shoulder 7 against the inturned flange 8.

According to my invention, I provide a spring retainer comprising a strip 9 formed of flexible metal and provided with inturned flanges 10 at its ends. Attached to strip 9 by suitable means, such as by welding, are two pairs of spaced holders 11, the holders having angular ends which form shoulders 12. Carried by each pair of holders is a straight spring 13, the ends of which are located under and held by shoulders 12 and the central portions of which bear against the peripheral surface of the packing ring and serve to hold it in position.

Two spring holding strips, as shown in Fig. 3, are utilized in connection with the packing, one for the upper half of the packing and the other for the lower half of the packing. At 14 are two pins which serve to position the upper half of the packing member and the upper spring retainer. These pins serve also to keep the packing member and the spring holders from moving circumferentially.

My improved construction has special utility in that it enables the spring retainers to be readily assembled in and removed from the diaphragm. In assembling the construction, one end of a spring holder 9 is started into the recess 6 in one-half of the diaphragm, for example, the lower half, and after being fed down a limited amount so that it assumes a curved position the first spring 13 is put in place under the shoulders 12. The spring retainer is then further fed into the recess, the second spring 13 being inserted at the proper time. Following this, the lower half of the packing member is fed into the recess. The same procedure is followed in connection with the upper half of the diaphragm. Since the strip 9 is flexible it is readily bent in being fed into the recess.

By this arrangement, it will be seen that the spring holder and the springs can be very readily positioned in the recess 6 back of the packing member, and when positioned the holders serve to hold the springs in correct position relative to the packing. When the structure is to be dismantled, it is simply necessary to pull on the end of the spring holder when the spring holder and the springs carried by it are removed. Thus the structure is easy to assemble and dismantle.

The arrangement has the further advantage that it is simple in structure and can be provided at low cost. At the same time, however, it performs its intended function in a satisfactory manner.

In accordance with the provisions of the patent statute, I have described the principle of operation of my invention, together with the apparatus which I now consider to represent the best embodiment thereof; but I desire to have it understood that the apparatus shown is only illustrative and that the invention may be carried out by other means.

What I claim as new and desire to secure by Letters Patent of the United States is:—

1. The combination with a shaft, a nozzle diaphragm having an opening through which the shaft projects, said diaphragm having an annular recess, and a packing member carried in said recess, of a spring retainer for the packing member comprising a flexible strip capable of being fed into the recess and one or more springs carried by said strip.

2. The combination with a shaft, a packing for the shaft and an annular member surrounding the packing and defining an annular space therewith, of a spring retainer for the packing comprising a flexible strip in the annular space bearing against the annular member and held thereagainst by reason of its flexibility, said strip being capable of being slid endwise into the annular space, and one or more springs carried by the strip and engaging the packing.

3. The combination with a shaft, a packing for the shaft and an annular member surrounding the packing and defining an annular space therewith, of springs located in said space, each spring having a portion bearing against the packing, and a retaining means for the springs comprising a flexible strip having one of its sides bearing against the inner surface of the annular member and holding members provided on the other side of the strip and engaging the springs.

4. The combination with a shaft, a packing comprising two halves and surrounding the shaft and an annular member surrounding the packing and defining an annular space therewith, of a plurality of springs located in said space and having intermediate portions engaging the packing and forcing it towards the shaft and retaining means for the springs comprising two flexible, circularly arranged strips bearing against the inner surface of the annular member, and pairs of spaced holders having shoulders and being secured to the strips for retaining the ends of the springs.

5. The combination with a shaft, a packing for the shaft and an annular member surrounding the packing and defining an annular space therewith, of a straight, flexible strip bent during the assembling operation to conform to the wall of the annular member and held thereagainst by its flexibility, and spring means carried by the strip and engaging the packing.

In witness whereof, I have hereunto set my hand this tenth day of October, 1929.

EDMUND MERRILL PHILLIPS.